(12) United States Patent
Boyce et al.

(10) Patent No.: US 11,117,677 B2
(45) Date of Patent: Sep. 14, 2021

(54) AIRCRAFT FILTER SYSTEM WITH AIRSPEED COMPENSATION

(71) Applicant: DONALDSON COMPANY, INC., Minneapolis, MN (US)

(72) Inventors: Mark E. Boyce, Saint Charles, MO (US); Matthew A. Brown, O'Fallon, MO (US)

(73) Assignee: Donaldson Company, Inc., Minneapolis, MN (US)

(*) Notice: Subject to any disclaimer, the term of this patent is extended or adjusted under 35 U.S.C. 154(b) by 694 days.

(21) Appl. No.: 15/964,774

(22) Filed: Apr. 27, 2018

(65) Prior Publication Data
US 2018/0312270 A1    Nov. 1, 2018

Related U.S. Application Data

(60) Provisional application No. 62/491,709, filed on Apr. 28, 2017.

(51) Int. Cl.
*B64D 33/02* (2006.01)
*B01D 46/00* (2006.01)
(Continued)

(52) U.S. Cl.
CPC ......... *B64D 33/02* (2013.01); *B01D 46/0086* (2013.01); *B64D 27/02* (2013.01);
(Continued)

(58) Field of Classification Search
CPC .............. B64D 33/02; B64D 45/00; B64D 2045/0085; F02C 7/052; B01D 46/0086;
(Continued)

(56) References Cited

U.S. PATENT DOCUMENTS

| | | | | |
|---|---|---|---|---|
| 3,411,272 A | * | 11/1968 | Carmon | B64D 33/02 96/418 |
| 3,449,891 A | * | 6/1969 | Amelio | F02B 61/04 55/306 |

(Continued)

FOREIGN PATENT DOCUMENTS

| | | |
|---|---|---|
| DE | 102008017962 A1 | 12/2009 |
| EP | 1494032 A1 | 1/2005 |

(Continued)

OTHER PUBLICATIONS

International Patent Application No. PCT/US2018/029774, filed Apr. 27, 2018; International Search Report / Written Opinion dated Sep. 3, 2018; 20 pages.

(Continued)

*Primary Examiner* — Brian M O'Hara
*Assistant Examiner* — Keith L Dixon
(74) *Attorney, Agent, or Firm* — Mueting Raasch Group

(57) ABSTRACT

A system and method of compensating for airspeed when measuring pressure drop across a filter system on an aircraft may include a pressure compensator, an internal pressure sensor, and an external pressure sensor. A filter media may be located around a housing such that air flows through the filter media into a clean air space defined by the filter media and the housing. The pressure compensator may be located outside of the clean air space and within an airstream of the aircraft. The internal pressure sensor may be configured to measure an internal pressure that varies with airspeed and the external pressure sensor may be located on the pressure compensator to measure an external pressure. The external pressure sensor may be positioned such that the external pressure varies according to a known relationship relative to the internal pressure as the airspeed of the aircraft changes.

22 Claims, 7 Drawing Sheets

(51) Int. Cl.
    *B64D 45/00*     (2006.01)
    *B64D 27/02*     (2006.01)
    *G01N 15/08*     (2006.01)
    *F02C 7/052*     (2006.01)
    *F02C 7/05*     (2006.01)
    *B64C 27/04*     (2006.01)

(52) U.S. Cl.
CPC ............... *B64D 45/00* (2013.01); *F02C 7/05* (2013.01); *F02C 7/052* (2013.01); *G01N 15/0826* (2013.01); *B01D 46/0068* (2013.01); *B01D 2279/60* (2013.01); *B64C 27/04* (2013.01); *B64D 2033/0246* (2013.01); *B64D 2045/0085* (2013.01); *G01N 2015/084* (2013.01)

(58) Field of Classification Search
CPC ........... B01D 2279/60; G01N 15/0826; G01N 2015/084
See application file for complete search history.

(56) References Cited

U.S. PATENT DOCUMENTS

| | | | | |
|---|---|---|---|---|
| 5,662,292 A | * | 9/1997 | Greene | B64D 33/02 244/53 B |
| 6,595,742 B2 | | 6/2003 | Scimone | |
| 6,824,582 B2 | | 11/2004 | Wilson | |
| 7,192,462 B2 | | 3/2007 | Stelzer et al. | |
| 7,491,253 B2 | * | 2/2009 | Wilson | B01D 46/002 123/198 E |
| 7,575,014 B2 | | 8/2009 | Stelzer | |
| 7,941,253 B1 | | 5/2011 | Brant | |
| 8,961,634 B2 | * | 2/2015 | Boyce | B01D 46/0087 55/306 |
| 9,254,921 B2 | * | 2/2016 | Braeutigam | B64D 33/02 |
| 2010/0065139 A1 | | 3/2010 | Osswald et al. | |
| 2014/0260127 A1 | * | 9/2014 | Boyce | B64D 33/02 55/306 |

FOREIGN PATENT DOCUMENTS

| | | |
|---|---|---|
| EP | 2743178 A1 | 6/2014 |
| EP | 2743178 B1 | 8/2016 |
| WO | WO 2018/200941 A1 | 11/2018 |

OTHER PUBLICATIONS

International Patent Application No. PCT/US2018/029774, filed Apr. 27, 2018, International Preliminary Report on Patentability dated Oct. 29, 2019, 12 pages.
International Patent Application No. PCT/US2018/029774, filed Apr. 27 2018, Invitation to Pay Additional Fees (with partial search report) dated Jul. 10, 2018, 14 pages.

\* cited by examiner

AIRCRAFT FILTER SYSTEM WITH AIRSPEED COMPENSATION

RELATED APPLICATION

This application claims the benefit under 35 U.S.C. § 119 of U.S. Provisional Application Ser. No. 62/491,709, filed 28 Apr. 2017, and titled AIRCRAFT FILTER SYSTEM WITH AIRSPEED COMPENSATION, which is incorporated herein by reference in its entirety.

The disclosure herein relates generally to air filter systems for aircraft and related methods.

Filter systems for aircraft such as, e.g., helicopters include those described in U.S. Pat. Nos. 6,595,742; 6,824,582; 7,192,462; 7,491,253; 7,575,014; and 8,961,634. The known filter systems in which pressure drop across the filter system is measured do not accurately compensate for changes in airspeed of the aircraft with which they are used.

SUMMARY

Air filter systems for aircraft and related methods are described herein. In one or more embodiments, the air filter systems for aircraft and related methods compensate for changes in pressure across the filter system at varying airspeeds. In one or more embodiments, the air filter systems for aircraft and related methods may provide enhanced protection from impact during operation.

An exemplary method of compensating for airspeed when measuring pressure drop across a filter system mounted on an aircraft may include measuring internal pressure, measuring external pressure, and providing an alert in the aircraft indicative of filter restriction. The filter system may include a housing and filter media defining a clean air space into which air flows through the filter media. The measuring an internal pressure may be within the clean air space and the internal pressure may vary as the airspeed changes. The measuring an external pressure may be on the aircraft outside of the clean air space. The external pressure may be measured at an external location selected such that the external pressure may vary as the airspeed changes and may provide a known relationship relative to the internal pressure as the airspeed changes. The providing an alert in the aircraft indicative of filter restriction may be when a pressure differential between the internal pressure and the external pressure deviates by a selected amount.

In one or more embodiments, the method may include adjusting the selected amount based at least in part on the known relationship. In one or more embodiments, the alert indicative of filter restriction may be provided over a selected range of airspeeds. In one or more embodiments, the external location may be selected such that the known relationship between the internal pressure and the external pressure may be proportional over the selected range of airspeeds. In one or more embodiments, the known relationship between the internal pressure and the external pressure may be directly proportional over the selected range of airspeeds. In one or more embodiments, the known relationship between the internal pressure and the external pressure may be inversely proportional over the selected range of airspeeds. In one or more embodiments, the external location may be selected such that the known relationship between the internal pressure and the external pressure may be a known function over the selected range of airspeeds.

In one or more embodiments, the external location may be disposed on a pressure compensator located outside of the clean air space and within an airstream of the aircraft. In one or more embodiments, the pressure compensator may be coupled to the housing and protrudes from the housing. In one or more embodiments, the pressure compensator may define a cross-sectional shape selected from the group consisting of circular, elliptical, semi-circular, and airfoil. In one or more embodiments, the providing an alert in the aircraft indicative of filter restriction may include using a pressure switch to determine when the internal pressure deviates by the selected amount from the known relationship. In one or more embodiments, the pressure switch may provide a signal when the internal pressure deviates by the selected amount from the known relationship. In one or more embodiments, the pressure switch may provide the signal in response to movement of a switch member of the pressure switch.

In one or more embodiments, the internal pressure may be measured using an internal pressure transducer. In one or more embodiments, the external pressure may be measured using an external pressure transducer. In one or more embodiments, the internal pressure may be measured at an internal location and the external pressure may be measured at the external location. The internal and external locations may be across the filter media from one another and proximate a similar location of the housing. In one or more embodiments, measuring the internal pressure may include using an internal pressure port within the clean air space and measuring the external pressure may include using an external pressure port outside of the clean air space. The method may further include measuring the pressure differential between the internal pressure port and the external pressure port. In one or more embodiments, the external pressure may be measured proximate the filter media outside of the clean air space.

An exemplary filter system mounted on an aircraft, described herein, may include a housing, a filter media, a pressure compensator, an internal pressure sensor, and an external pressure sensor. The housing may extend between a first end portion and a second end portion and may define a clean air space. The housing may define a clean air port proximate the second end portion of the housing for coupling to an air intake. The filter media may be located around the housing such that air flows through the filter media into the clean air space. The pressure compensator may be located outside of the clean air space and within an airstream of the aircraft. The pressure compensator may be configured to compensate for the airspeed of the aircraft. The internal pressure sensor may be located within the clean air space and may be configured to measure an internal pressure in the clean air space. The internal pressure may vary as the airspeed changes. The external pressure sensor may be located at an external position on the pressure compensator and may be configured to measure an external pressure outside of the clean air space. The external pressure measured at the external position may vary according to a known relationship relative to the internal pressure as the airspeed changes.

In one or more embodiments, the pressure compensator may be coupled to the housing and protrudes from the housing. In one or more embodiments, the pressure compensator may define a cross-sectional shape selected from the group consisting of circular, elliptical, semi-circular, and airfoil. In one or more embodiments, filter system may be configured to provide an alert indicative of filter restriction when a pressure differential between the internal pressure and the external pressure deviates by a selected amount from the known relationship. In one or more embodiments, the filter system may also include a pressure switch configured to provide the alert indicative of filter restriction when the internal pressure deviates by the selected amount. In one or more embodiments, the pressure switch may include a micro-switch and a switch member configured to move relative to the micro-switch such that the pressure switch may transmit a signal when the internal pressure deviates by the selected amount. In one or more embodiments, the selected amount may be adjusted at least in part by the known relationship.

In one or more embodiments, the internal pressure sensor may include an internal pressure transducer and the external pressure sensor may include an external pressure transducer. In one or more embodiments, the internal pressure sensor may be proximate an internal location and the external pressure sensor may be proximate the external location. The internal and external locations may be across the filter media from one another and proximate a similar location of the housing. In one or more embodiments, the internal pressure sensor may include an internal pressure port within the clean air space and the external pressure sensor may include an external pressure port outside of the clean air space. A pressure differential may be measured between the internal pressure port and the external pressure port. In one or more embodiments, the external pressure sensor may be positioned such that the known relationship between the internal pressure and the external pressure may be proportional over a selected range of airspeeds. In one or more embodiments, the known relationship between the internal pressure and the external pressure may be directly proportional over the selected range of airspeeds. In one or more embodiments, the known relationship between the internal pressure and the external pressure may be inversely proportional over the selected range of airspeeds. In one or more embodiments, the external pressure sensor may be positioned such that the known relationship between the internal pressure and the external pressure may be a known function over the selected range of airspeeds. In one or more embodiments, the filter system may also include a grate proximate the first end portion of the housing and defining grate openings within the grate through which air passes when passing into the clean air space through the first end portion of the housing. In one or more embodiments, the filter system may further include one or more struts extending between the first and second end portions, wherein the struts support the grate and are configured to transfer forces incident on the grate to the aircraft in place of the housing of the filter system. In one or more embodiments, a screen is located between filter media positioned on the first end portion of the housing and the grate and, optionally, wherein the screen comprises screen openings, and wherein grate openings are greater than or equal to two times, greater than or equal to four times, greater than or equal to 10 times, or greater than or equal to 20 times the screen openings.

An exemplary aircraft described herein may include a fuselage, an aircraft engine, and the filter system described herein. The fuselage may define a forward direction. The aircraft engine may be operably coupled to the fuselage. The aircraft may define an air intake for receiving intake air. The filter system may be coupled to the air intake. Air passing through the filter system may enter the air intake during operation of the aircraft.

Another exemplary filter system mounted on an aircraft, described herein, may include a housing, filter media, a grate, and one or more struts. The housing may extend between a first end portion and a second end portion and may define a clean air space. The housing may define a clean air port proximate the second end portion of the housing for coupling to an air intake. The filter media may be operably attached to the housing such that air flowing through the filter media flows into the clean air space. The grate may be proximate the first end portion and may define openings within the grate. The one or more struts may extend between the first and second end portions.

In one or more embodiments, the filter system may also include a pressure compensator, an internal pressure sensor, and an external pressure sensor. The pressure compensator may be located outside of the clean air space and within an airstream of the aircraft. The pressure compensator may be configured to compensate for airspeed of the aircraft. The internal pressure sensor may be located within the clean air space and may be configured to measure an internal pressure. The internal pressure may vary as the airspeed changes. The external pressure sensor may be located at an external position on the pressure compensator and may be configured to measure an external pressure. The external pressure sensor may be positioned such that the external pressure may vary as the airspeed changes and may provide a known relationship relative to the internal pressure.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Figure 1:
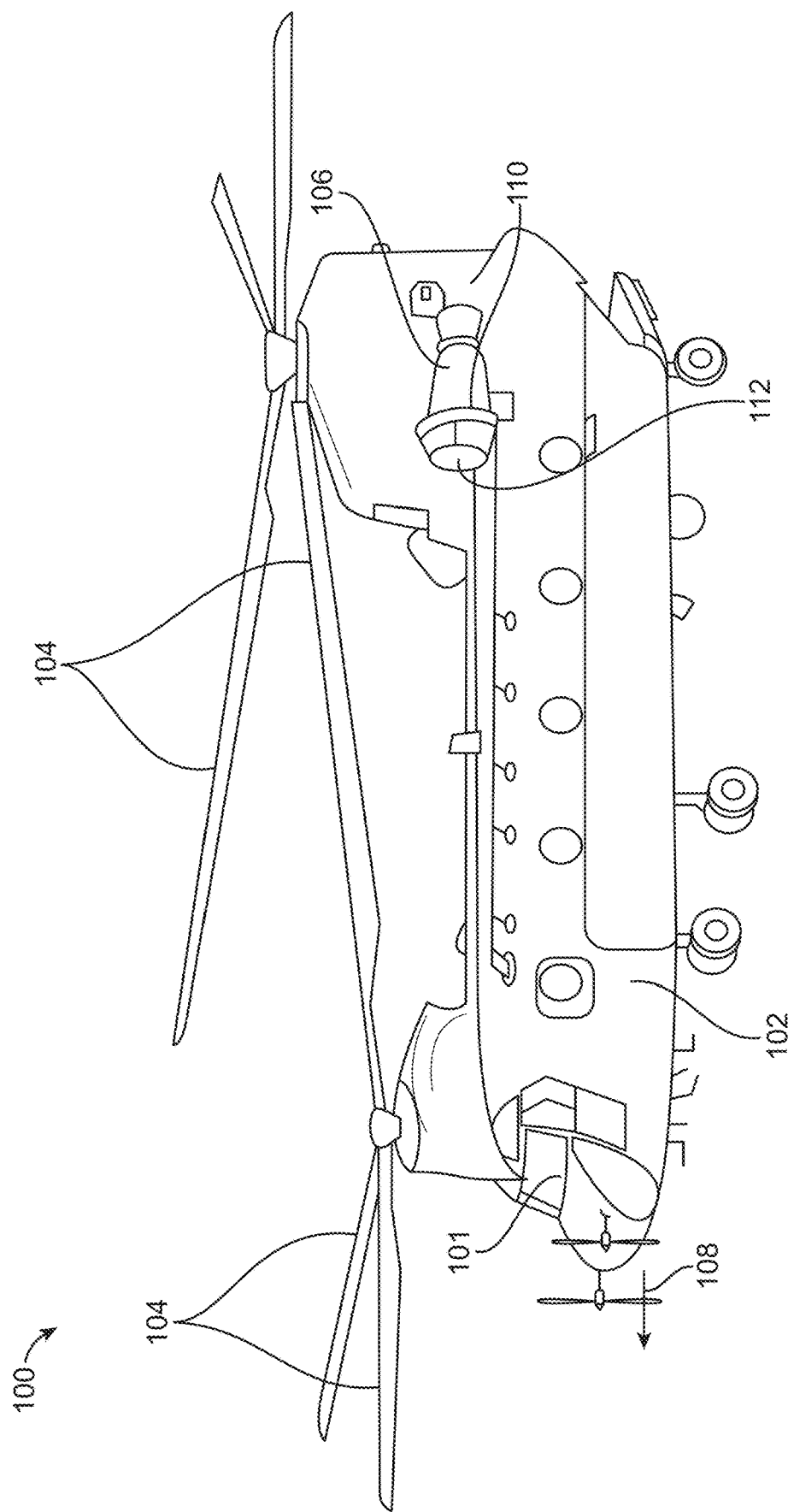
FIG. 1 is a side perspective view of one illustrative embodiment of an aircraft as described herein.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

The disclosure herein includes illustrative embodiments of systems, apparatus, structures, and methods for a filter system that compensates for airspeed of an aircraft (e.g., a helicopter). It is desirable to measure the pressure differential across an air filter on the main engine of a helicopter to monitor the health of the air filter. As the filter becomes increasingly dirty, the pressure differential may increase because e.g., while the pressure outside of the air filter may remain relatively stable, the pressure within the clean air space of the air filter will significantly decrease because of the increased resistance to air passing through a dirty filter. A pressure switch may be used to measure this pressure differential between outside of the filter and within the clean air space of the air filter and produce an alert when the pressure differential deviates by a selected amount. In other words, when the pressure differential is indicative of a dirty filter, the pilot or other personnel may be alerted of the issue (with the alert taking the form of one or more of a visual, audible, and/or tactile alert).

Furthermore, when the airspeed of the aircraft increases, the pressure on the engine side (e.g., within the clean air space of the air filter) of the air filter may naturally decrease. As a result, it may appear (e.g., to the pilot) that the filter is dirty due to this decreased pressure at an increased airspeed. This present disclosure describes methods and apparatus for positioning an external pressure sensor to measure an external pressure that provides a known relationship with the pressure within the clean air space at varying airspeeds. For example, if the relationship between the internal pressure and the external pressure at different airspeeds is known, it may be possible to determine whether or not the pressure differential between the internal pressure and external pressure is, e.g., indicative of a dirty filter. In one or more embodiments, the external pressure may be measured at a position outside of the clean air space that decreases proportionally to the decreasing internal pressure at varying airspeeds. If there is a proportional relationship between the external and internal pressures, a pressure switch may be used to detect the pressure differential across the filter media, while compensating for changes in airspeed due to the proportional relationship and, therefore, a more accurate indication of the filter health can be determined.

In one or more embodiments, the external pressure may be measured on a pressure compensator located outside of the clean air space in a position in which the pressure compensator is exposed to the airstream passing over the aircraft. The pressure compensator may produce a pressure gradient along an exterior surface of the pressure compensator due to a variety of aerodynamic forces. A selected location on the pressure compensator may be used that has a known relationship with the internal pressure at the varying airspeeds of the aircraft. Therefore, in some embodiments, the selected location on the pressure compensator may be chosen to measure external pressure (e.g., tapped, etc.) such that the pressure varies with airspeed of the aircraft at a known relationship to (e.g., similar to) the variations in internal pressure as measured within the clean air space of the air filter (e.g., on the other side of the filter media). It is noted that the selected location at which the external pressure is measured (e.g., on the pressure compensator) may vary depending on the type of aircraft (e.g., due to varying environmental factors attributed to different aircraft).

One illustrative embodiment of a filter system 112 mounted on an aircraft 100 is depicted in FIG. 1. In this embodiment, the aircraft 100 is a helicopter although the filter systems described herein may, in one or more embodiments, be useful with, e.g., fixed wing aircraft. Many different helicopters may use one or more embodiments of the filter systems and methods as described herein. For example, the filter systems and methods may be used with various helicopters such as the MH-47, S-61, SH3, BV-107, CH-46 AS 332, Super Puma, MI-17, KA-27, and/or KA-32, CH-47.

The aircraft 100 depicted in FIG. 1 includes a fuselage 102, rotors 104, and two aircraft engines 106 located on opposite sides of the aircraft 100 below rear rotor 104 (although only one engine 106 is seen in FIG. 1). The aircraft engine 106 may be in the form of a turbine engine, a piston engine, or another type of engine suitable for driving the rotors 104 to provide lift and/or thrust for the aircraft 100. The fuselage 102 may define a forward direction 108, as designated in FIG. 1. The aircraft engine 106 may be operably coupled to the fuselage 102. In the depicted embodiment, the aircraft engine 106 includes an air intake 110 receiving air flow for use by aircraft engine 106 in a combustion process. It may be appreciated that other helicopter embodiments may include a different number of intakes for receiving intake air usable in a combustion process. In some embodiments, the intakes 110 may face the forward direction 108 (or includes openings directed towards the forward direction 108), such that forward movement of the aircraft 100 may cause intake air to flow into the intake 110.

As illustrated in FIG. 1, helicopter 100 may include a filter system 112 mounted on air intake 110. It may be appreciated that other helicopter embodiments may include a different number of air intakes and/or filter assemblies. In one or more embodiments, each of the filter systems 112 may be coupled to a respective one of the intakes 110. Intake air may pass through the filter system 112 prior to entering the air intake of aircraft engine 106. The filter system 112 may be structured to filter intake air to remove containments therefrom, prior to permitting the intake air to enter the aircraft engine 106.

Figure 2:
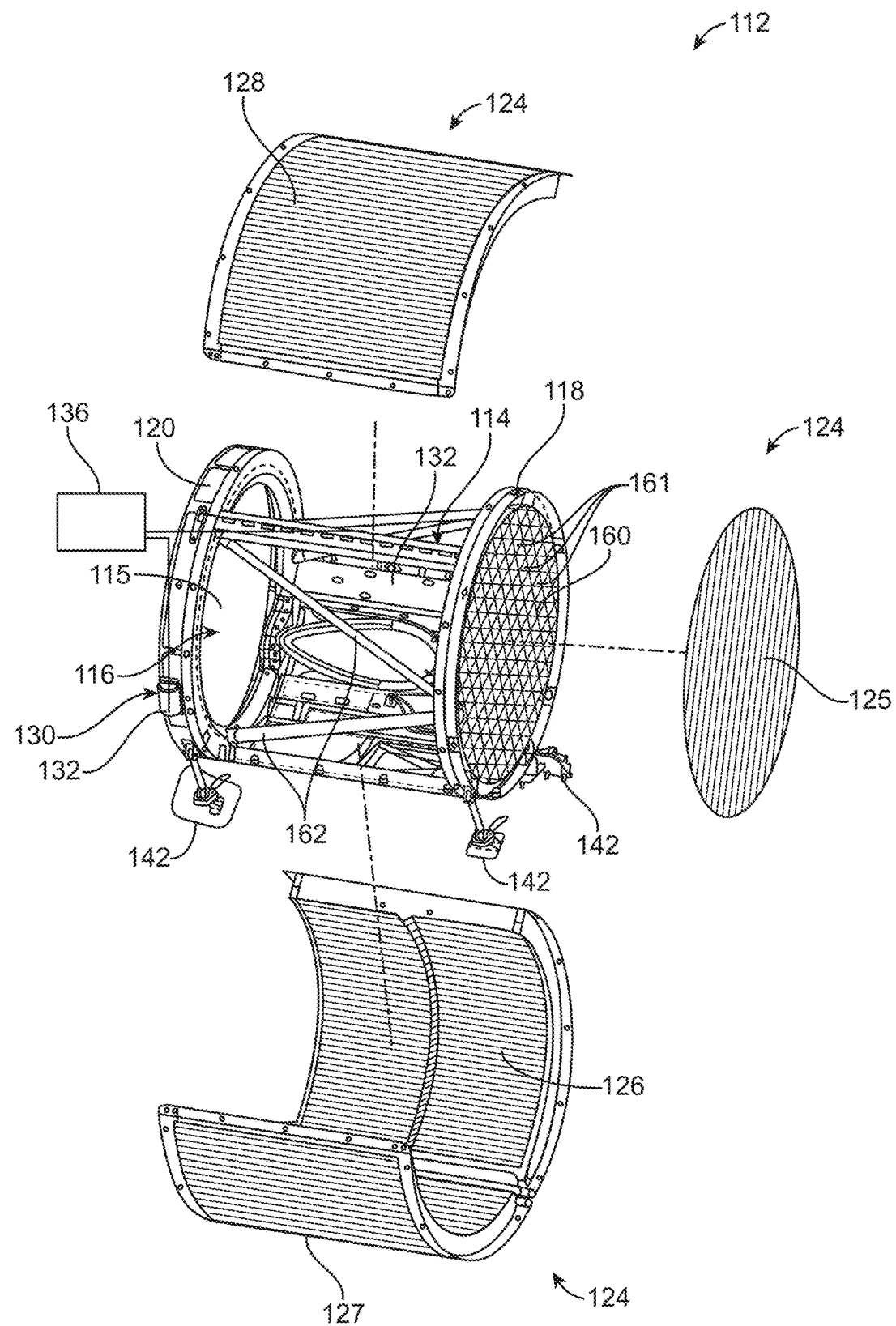
FIG. 2 is an exploded perspective view of one illustrative embodiment of a filter system with filter media removed from a housing of the filter system.
Figure 3:
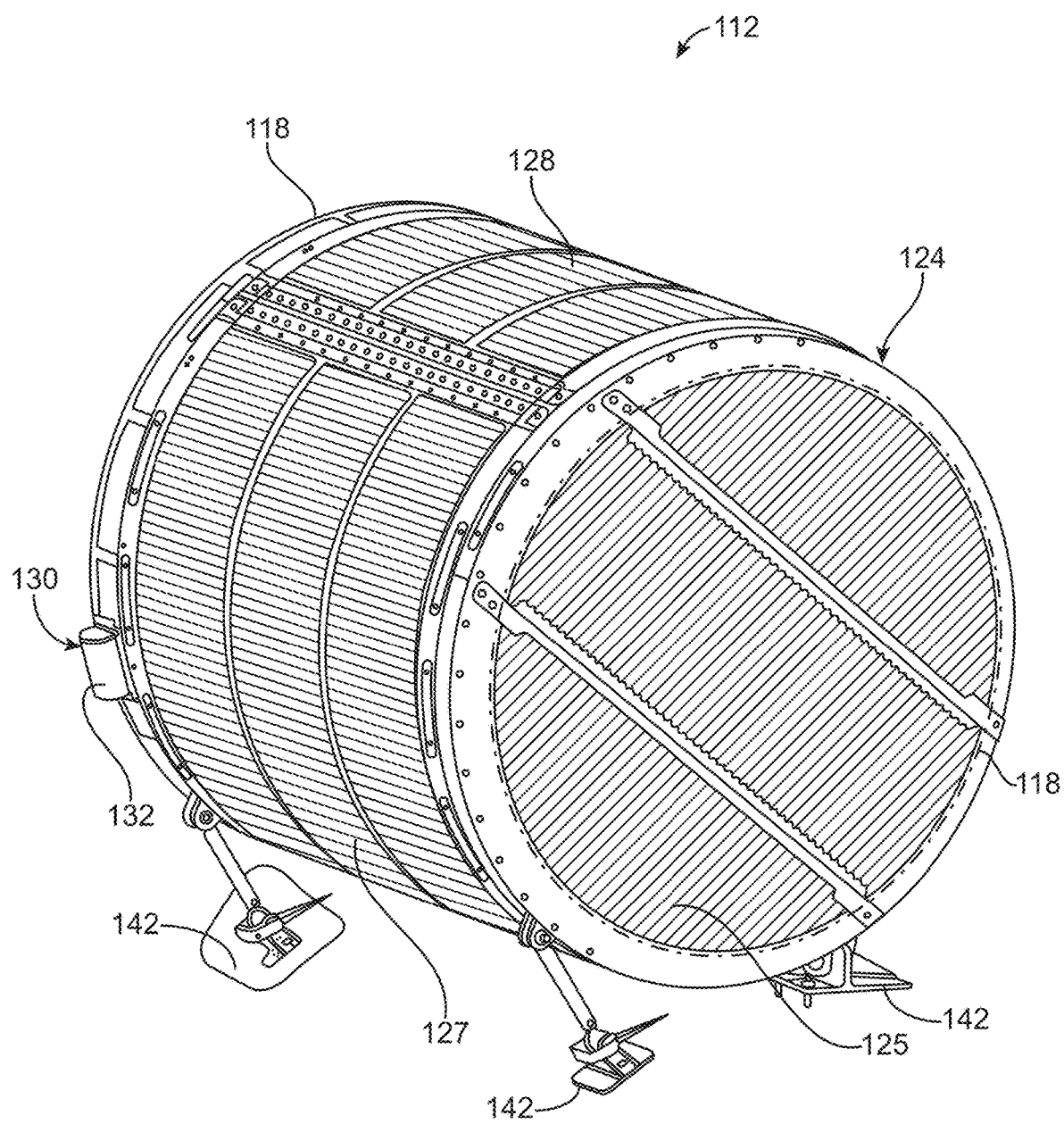
FIG. 3 is a perspective view of the filter system of FIG. 2.

The illustrative embodiment of filter system 112 depicted in FIGS. 2 and 3 includes a housing 114, filter media 124, a pressure compensator 130, an internal pressure sensor 154, and an external pressure sensor 152. The housing 114 may extend between a first end portion 118 and a second end portion 120. The housing 114 and the filter media 124 define a clean air space 116 within the housing 114 and the filter media 124. As shown, the filter system 112 may define a substantially cylindrical cross-section and the housing 114 and the filter media 124 may define a substantially annular cross-section. In other embodiments, the filter system 112 may define a variety of different shapes. Further, the housing 114 may define a clean air port 115 proximate the second end portion 120 of the housing 114 for coupling to an air intake of the of the aircraft engine 106.

The filter media 124 may be located around the housing 114 or described as disposed at least partially about a circumference of the housing 114. The filter media 124 may be positioned and/or arranged such that air entering the clean air space 116 must pass through the filter media 124 (unless the integrity of the filter media 124 is compromised and/or a bypass structure (such as that described in, e.g., U.S. Pat. No. 8,961,634 (Boyce)) is used to bypass the filter media 124). The filter media 124 is configured to remove contaminants from the air entering the clean air space 116 through the filter media 124.

A variety of different configurations (e.g., size, shape, number of elements, orientation, etc.) of filter media 124 may be included in one or more embodiments of the filter systems as described herein. For example, as shown in FIG. 2, the filter media 124 includes filter elements 125, 126, 127, and 128. Specifically, filter elements 126, 127, 128 are positioned circumferentially around the housing 114 between the first end portion 118 and the second end portion 120 and filter element 125 is positioned proximate the first end portion 118. Each filter element 125, 126, 127, 128 of the filter media 124 may, in one or more embodiments, define a particle removal efficiency, e.g., of at last about 97%, for 5-80 micron particles. As such, the filter elements 125, 126, 127, 128 may be configured to remove particle contaminants from the intake air, including sand and/or dust, which may be prevalent in various operating environments for the aircraft 100.

Due to one or more reasons, the filter media 124 may become restricted (e.g., due to a build up of dust, sand, ice, etc.) during operation of the aircraft 100, such that the intake air pressure is reduced. The pressure differential between the clean air space 116 within the filter system 112 and outside of the filter system 112 (e.g., measured by pressure differential across the filter media 124) may be monitored such that reductions in the internal pressure may be indicative of a dirty filter. Increases in the airspeed of the aircraft 100 may, however, also result in reduced air pressure within the clean air space 116 and that reduced internal air pressure may produce a false reading that the filter is dirty and should be replaced when, in fact, the filter is not yet at a condition requiring replacement. Therefore, it may be desirable to compensate for changes in the internal pressure measurement with increasing airspeeds to adjust for the effect of the airspeed of the aircraft 100 on the internal pressure measurement.

For example, one or more embodiments of the methods described herein may include measuring an internal pressure within the clean air space 116, measuring the external pressure on the aircraft 100 outside of the clean air space 116, and providing an alert (e.g., in the aircraft) indicative of filter restriction when a pressure differential between the internal pressure and the external pressure deviates by a selected amount. The internal pressure may be measured at a location (e.g., internal location 134) within the clean air space 116 that varies as the airspeed of the aircraft changes, as described herein. Also, the external pressure may be measured at an external location 132 selected such that the external pressure varies as the airspeed changes and, further, provides a known relationship relative to the internal pressure as the airspeed of the aircraft 100 changes.

In one or more embodiments, an alert may be provided in the aircraft that is indicative of filter restriction when a pressure differential between the internal pressure in the clean air space 116 and the external pressure deviates by a selected amount. In one or more embodiments, the aircraft 100 may include a display module 101 to convey the alert to the user or anyone else positioned within the aircraft 100 (or the alert may be delivered to anyone else that may not be positioned within the aircraft 100) about the status of the health of the filter system 112.

The methods described herein may, in one or more embodiments, include adjusting the selected amount for the pressure differential based at least in part on the known relationship between changes in the external pressure and the internal pressure as the airspeed changes.

In one or more embodiments, the alerts indicative of filter restrictions may be provided only over a selected range or ranges of airspeeds. For example, it may be known that at lower airspeeds the pressure differential between the internal and external pressures is not significantly affected by changes in airspeed and, as a result, adjustments for or compensation for pressure differential changes due to airspeed may not be provided at lower airspeeds.

In one or more embodiments, the external location 132 at which the external pressure is measured may be selected such that the known relationship between the internal pressure and the external pressure is directly proportional. In other words, the drop in internal pressure as measured in the clean air space 116 may, over at least one or more selected ranges of airspeeds, be directly proportional to the drop in external pressure as measured at the selected external location 132. In one or more alternative embodiments, the external location 132 at which the external pressure is measured may be selected such that the known relationship between the internal pressure and the external pressure is inversely proportional. In other words, the drop in internal pressure as measured in the clean air space 116 may, over at least one or more selected ranges of airspeeds, be inversely proportional to an increase in external pressure as measured at the selected external location 132.

In one or more embodiments, the filter system 112 may include an internal pressure sensor 154 located within the clean air space 116 and configured to measure an internal pressure in the clean air space 116. As described herein, the internal pressure may vary as the airspeed of the aircraft 100 changes, e.g., the internal pressure may drop as the airspeed of the aircraft 100 increases. The filter system 112 may also include an external pressure sensor 152 located outside of the clean air space 116 (e.g., proximate the filter media 124) and configured to measure an external pressure outside of the clean air space 116. The external pressure sensor 152 may be positioned such that the external pressure measured may vary according to a known relationship to the internal pressure as the airspeed of the aircraft 100 changes.

Figure 6:
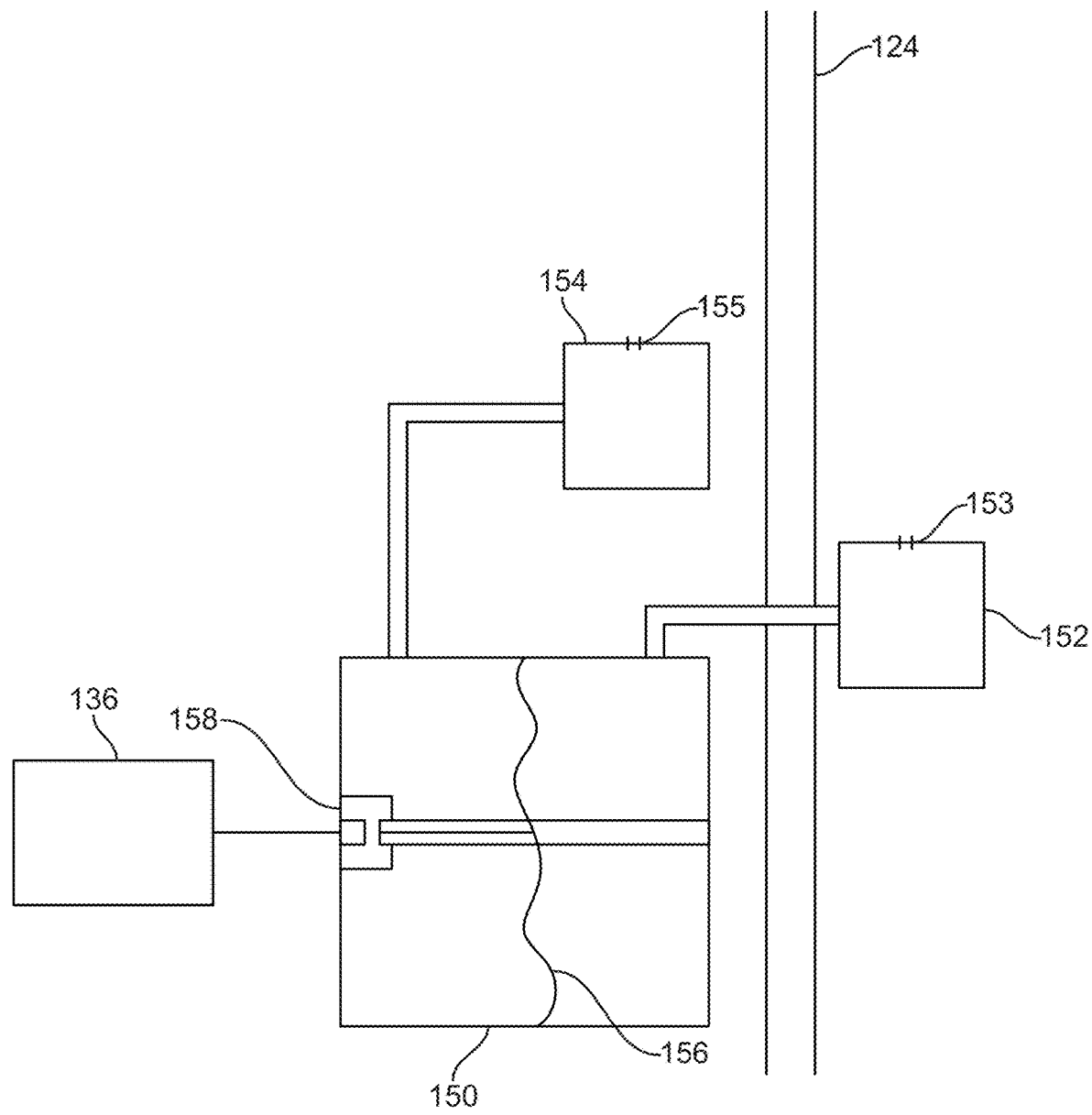
FIG. 6 is a schematic diagram of one illustrative embodiment of a filter system including an internal sensor, an external sensor, a pressure switch, and a controller.

The internal pressure sensor 154 and the external pressure sensor 152 may include any variety of apparatus suitable for measuring the pressure differentials as described herein. In one or more embodiments, the internal and external pressure sensors 154, 152 may be in the form of pressure transducers that are electrically coupled to a controller 136 that may be used to compare the internal and external pressures as measured by the pressure sensors 152, 154. If, for example, each of the internal and external pressure sensors 154, 152 is a pressure port, each of the pressure ports may lead to a pressure switch 150 (e.g., as shown in FIG. 6) to produce a pressure differential between the internal and external pressures. Such a pressure switch may, for example, open or close at a selected pressure differential to trigger the delivery of an alert as described herein.

The filter system 112 may, in one or more embodiments, include a pressure compensator 130 located outside of the clean air space 116 and within an airstream of the aircraft 100. The pressure compensator 130 may be configured to compensate for the airspeed of the aircraft 100. For example, the external pressure sensor 152 may be configured to measure external pressure at a selected location 132 on the pressure compensator 130 at which the external pressure varies according to a known relationship relative to the internal pressure as the airspeed of the aircraft 100 changes. In other words, the location at which the external pressure sensor measures external pressure on the pressure compensator 130 may inherently compensate for pressure changes at varying airspeeds.

The pressure compensator 130 may, in one or more embodiments, be coupled to the housing 114 at a variety of locations where the pressure compensator 130 is exposed to or acted on by air passing over the aircraft 100 during use. In one or more embodiments, the pressure compensator 130 may be in the form of a structure that protrudes from the housing 114. As shown in FIGS. 2 and 3, the depicted illustrative embodiment of pressure compensator 130 is located proximate the second end portion 120 of the housing 114, although other locations for a pressure compensator used in one or more embodiments of systems as described herein may be used.

The pressure compensators used in connection with the air filter systems and methods described herein may take a variety of cross-sectional shapes including, e.g., circular, elliptical, semi-circular, airfoil, etc. The differing profiles of the exterior surface of the pressure compensator 130 may result in different pressure gradients across the pressure compensator 130. The selected external location 132 at which the external pressure is measured may be chosen such that the external pressure profile at the selected external location 132 at varying airspeeds is known. Further, the selected external location 132 at which the external pressure is measured may be chosen such that the external pressure maintains a known relationship (e.g., a constant pressure differential) with the internal pressure at changing airspeeds.

Figure 4:
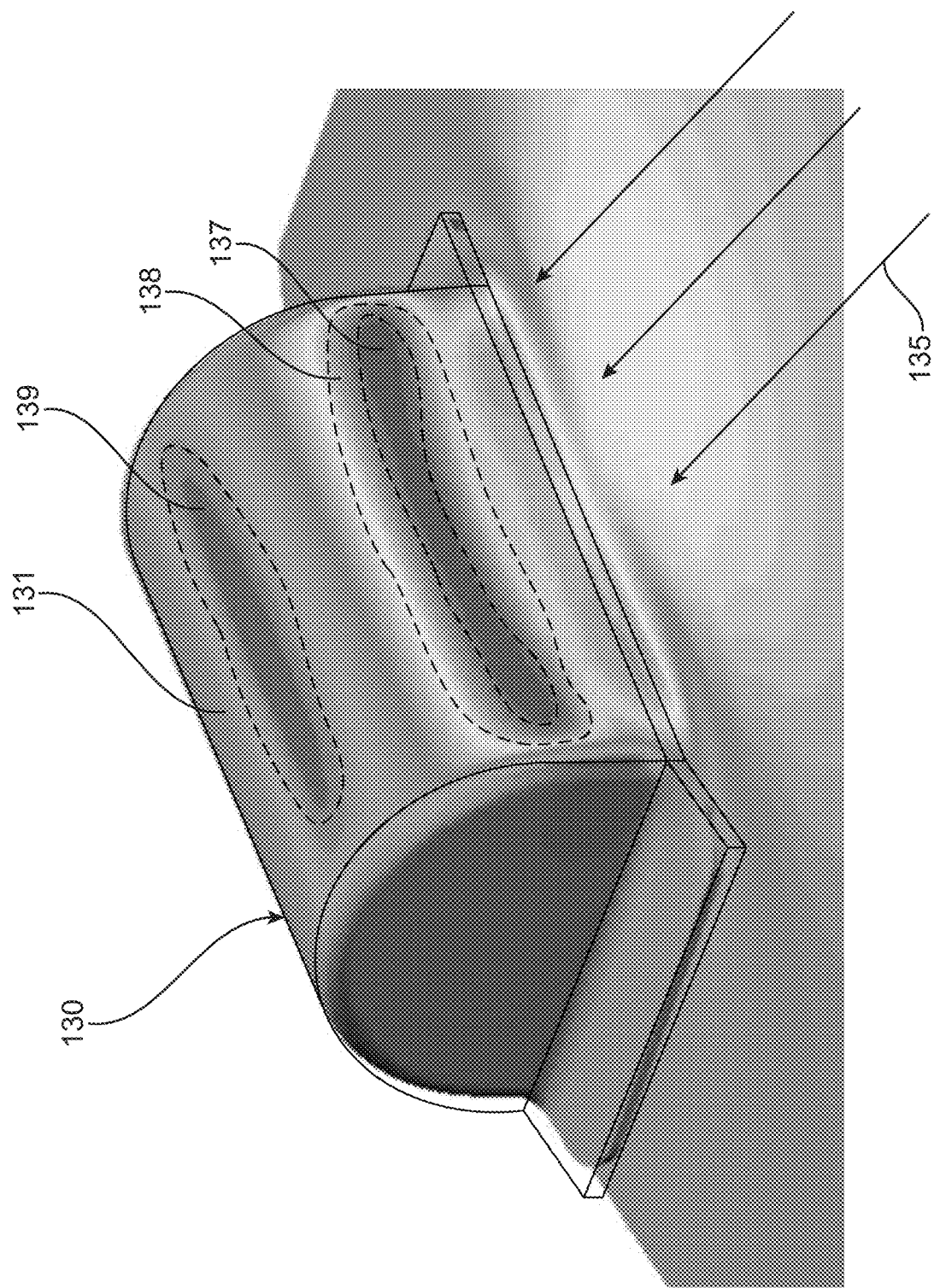
FIG. 4 is a perspective view of one illustrative embodiment of a pressure compensator with pressure gradient lines.

As shown in FIG. 4, the depicted illustrative embodiment of pressure compensator 130, in the form of a semicircular cylinder, produces pressure gradients at a given airspeed of the aircraft 100, with the pressure gradients resulting in, e.g., increasing pressure or decreasing pressure based on changes in airspeed. In other words, an airstream 135 passes over an exterior surface 131 of the pressure compensator 130 and produces a different pressure at different areas/locations. For example, within a first area 137, the pressure on the pressure compensator 130 may increase due to the direction of the air stream 135 relative to the orientation of that portion of the pressure compensator 130. Within a second area 138 located outside of the first area 137, the pressure on the pressure compensator 130 may be reduced (relative to, e.g., the pressure within the first area 137). In other areas, the pressure as measured on the pressure compensator 130 may actually decrease with increasing airspeed. For example, pressure as measured within a third area 139 may decrease due to increasing airspeed.

Figure 5:
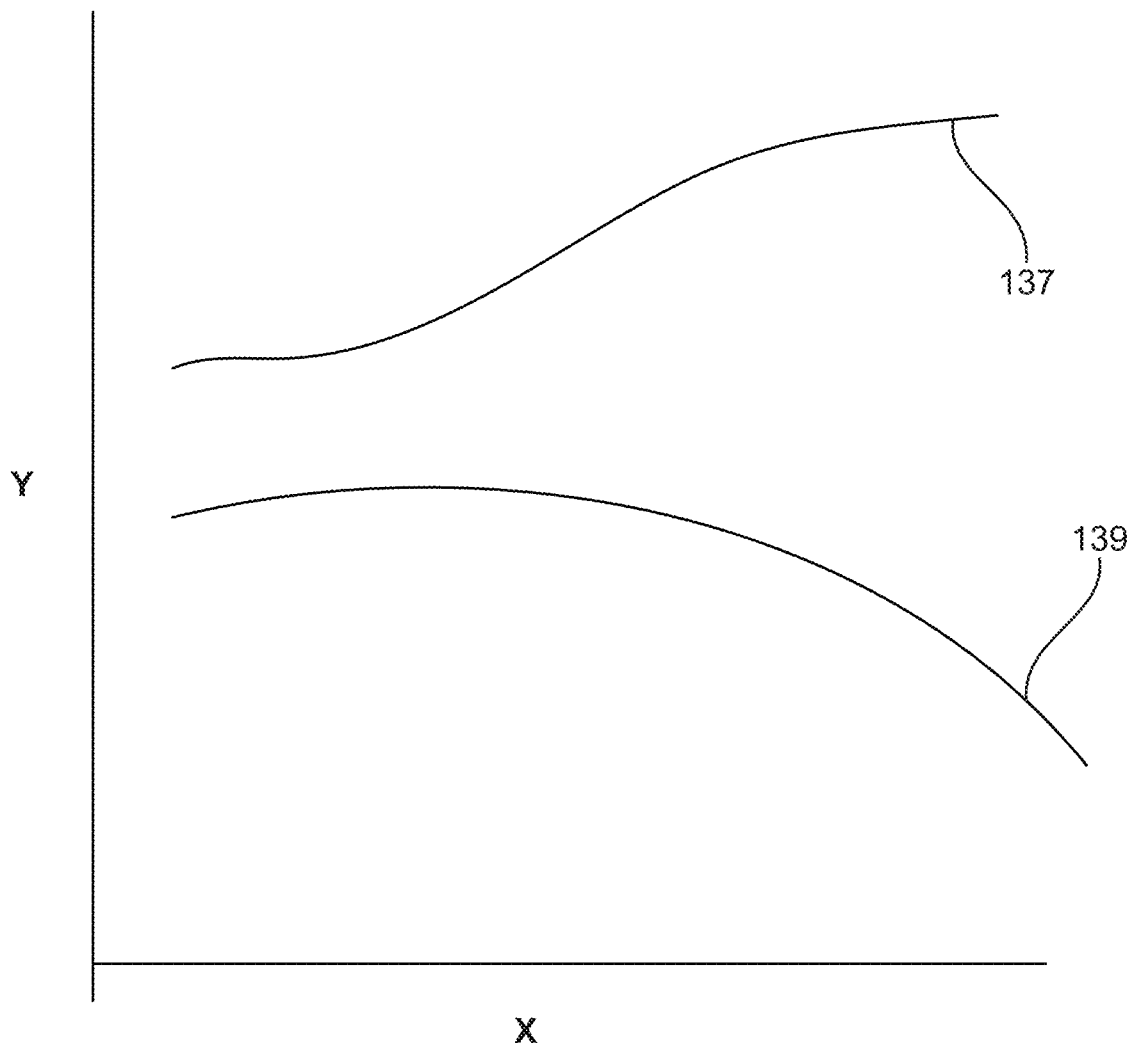
FIG. 5 is a graphical representation of airspeed (x-axis) versus pressure (y-axis) at various locations on a pressure compensator such as that depicted in FIG. 4.

Further, as shown in FIG. 5, depending on the selected external location on the pressure compensator, the pressure (y-axis) measured external to the clean air space 116 may vary with the airspeed (x-axis) of the aircraft 100. As a result, the pressure compensators used in one or more embodiments of air filter systems and methods as described herein may provide a variety of different locations for measuring an external pressure such that the location of the external pressure measurement may be selected to define a known relationship (e.g., a proportional relationship) with the pressure profile of the internal pressure over the varying airspeeds of the aircraft 100.

If the pressure differential across the filter media 124 deviates by a selected amount, it may be determined that the filter media 124 is likely dirty, i.e., the filter media 124 should be cleaned and/or replaced to improve airflow into the clean air space. This selected amount may be based on a variety of factors and may be chosen depending on desired operating ranges of the filter system 112. In some embodiments, the selected amount of pressure differential at which the filter media 124 is determined to be dirty may be adjusted based at least in part on the known relationship. For example, if there is a known relationship between the internal pressure and external pressure at a particular airspeed or range of airspeeds of the aircraft 100 (assuming a clean filter), the selected amount (at which the filter is considered dirty) may be determined by combining that known relationship pressure differential with the pressure differential that would be indicative of a dirty filter.

In one or more embodiments, the alert indicative of filter restriction may be provided over one or more selected ranges of airspeeds of the aircraft 100. For example, at lower airspeeds, it may be possible that the internal pressure may not be significantly affected by the airspeed of the aircraft 100.

In one or more embodiments, the external location 132 (where the external pressure is measured) may be selected such that the known relationship between the internal pressure and the external pressure may be proportional over the selected range of airspeeds of the aircraft 100. For example, the known relationship between the internal pressure and the external pressure may be directly proportional or inversely proportional over the selected range of airspeeds of the aircraft 100. If the known relationship is directly proportional, both the internal pressure and the external pressure may vary similarly as the airspeed of the aircraft 100 varies. For example, the external pressure may be measured such that the pressure differential between the internal pressure and the external pressure may be expected to remain constant over the varying airspeed of the aircraft 100.

If the pressure differential across a clean filter media 124 is always expected to be the same value or to vary only slightly due to changes in airspeed, then it may be simple to determine if the pressure differential deviates from that constant pressure differential value. As such, a pressure switch 150 may be utilized to track any deviation in the pressure differential because the pressure differential indicative of a dirty filter would be one selected value. In other words, the system may be considered a "dumb" system such that no computer processing may be necessary because the pressure switch 150 would simply send a signal when a specified pressure differential (indicative of a dirty filter) is measured.

Careful selection of the external location at which external pressure is measured on, e.g., a pressure compensator as described herein may yield such a result. In other words, a selected external location on one or more embodiments of a pressure compensator may provide an external pressure that varies in a manner that is directly proportional to the changes in internal pressure due to changes in airspeed.

For example, as shown in FIG. 6, the internal pressure sensor 154 may include an internal port 155 within the clean air space 116 and the external pressure sensor 152 may include an external pressure port 153 outside of the clean air space 116 (e.g., across the filter media 124). The pressure differential may be measured between the internal pressure port 155 and the external pressure port 153. For example, the pressure differential may be measured by a pressure switch 150 that opens or closes when the pressure differential reaches a selected value, with the opening or closing resulting in delivery of an alert the user that the pressure differential is indicative of filter restriction.

The pressure switch 150 may also include a micro-switch 158 and a switch member 156 (e.g., an elastic diaphragm) configured to move relative to the micro-switch such that the pressure switch 150 opens or closes when the internal pressure deviates by the selected amount. For example, the pressure differential within the pressure switch may cause the switch member 156 to move and actuate the micro-switch 158.

Also, for example, the internal pressure may be measured (e.g., via internal pressure sensor 154) at an internal location 134 (within the clean air space 116) and the external pressure may be measured at the external location 132 (outside of the clean air space 116 and, e.g., disposed on the pressure compensator 130). The internal location 134 and the external location 132 may be positioned relative to one another in any suitable way. Specifically, in one embodiment, the internal and external locations 134, 132 may be across the filter media 124 from one another and proximate a similar location of the housing 114. However, the internal and external locations 134, 132 may be anywhere relative to the filter system 112 to produce the desired known relationship between the internal and external pressures as airspeed of the aircraft 100 changes.

In other embodiments, the external location 132 of the measured external pressure may be selected such that the known relationship between the internal pressure and the external pressure may be a known function over one or more selected ranges of airspeeds. For example, the internal pressure sensor 154 may be in the form of an internal pressure transducer and the external pressure sensor 152 may be in the form of an external pressure transducer. The internal and external pressure transducers may measure the pressure at each corresponding location and then transmit the information to the controller 136. Thereafter, because the external pressure varies with the airspeed of the aircraft 100 according to a known relationship relative to the internal pressure, the controller 136 may account for the varying airspeed, because of the known function, when determining whether or not the pressure differential across the filter media 124 has deviated a selected amount (that would be indicative of a dirty filter).

One or more embodiments of the filter systems as described herein may be constructed to withstand the impact of various objects during operation without resulting in catastrophic failure of the filter system or the engine. For example, one or more embodiments of the filter systems described herein, such as, e.g., filter system 112 may include a grate 160 proximate the first end portion 118 of the housing 114, as shown in FIG. 2. The grate 160 may define openings 161 that are arranged in any suitable pattern and define any suitable dimension. For example, the openings 161 of the grate 160 may define openings 161 smaller than the size of projectiles that could be expected to cause damage that could result in engine failure.

The grate 160 may help to prevent larger projectiles (e.g., birds, etc.) from entering the clean air space of the filter system 112 and, thus, the intake 110 of the aircraft engine 106. In one or more embodiments, the grate 160 may be supported at the first end portion 118 by one or more struts 162 extending between the first and second end portions 118, 120. The one or more struts 162 may help to further resist force from projectiles contacting the filter system 112. For example, the grate 160 of the filter system 112 may be configured to withstand a force calculated by the weight, size, and velocity of the projectile.

Figure 7:
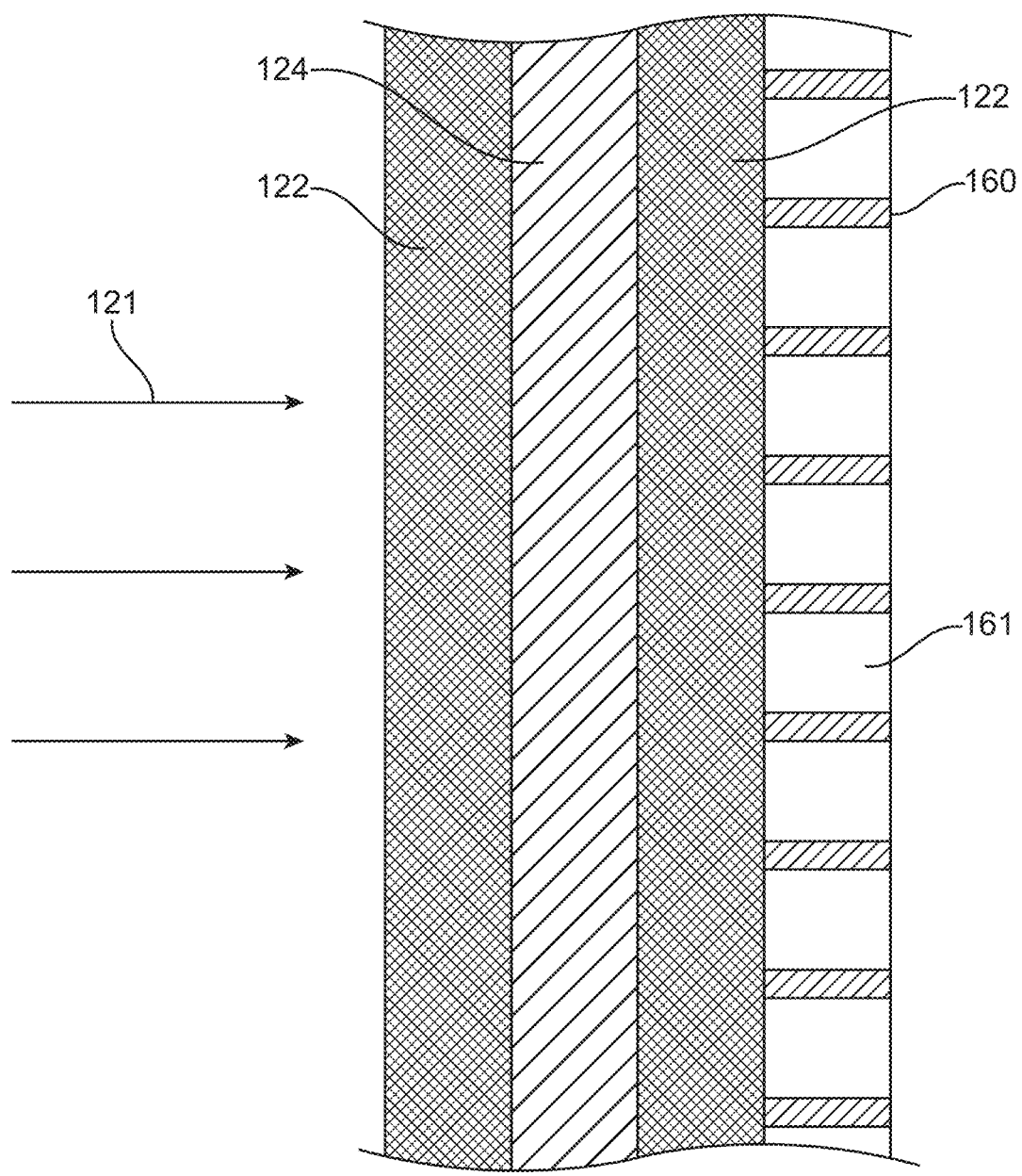
FIG. 7 is a cross-sectional schematic diagram of components that may be found on one or more embodiments of the filter systems as described herein.

Furthermore, in or more embodiments, the filter media 124 may have a layer of screen 122 (e.g., a steel screen, mesh, etc.) on one or both sides of the filter media 124, e.g., as shown in FIG. 7. For example, a layer of screen 122 may be adjacent the filter media 124 within the clean air space 116 and may be adjacent the filter media 124 outside of the clean air space 116. The air stream 121 may flow such that air passes through a first layer of screen 122, then the filter media 124, then a second layer of screen 122, and through the grate 160 into the clean air space 116. Because the filter media 124 may be sandwiched by the layers of screen 122 and the grate 160 is positioned behind the filter media 124, the impact of a projectile (e.g., a bird, etc.) would have to shear the screen 122 over the edges of the grate 160 to tear the filter media 124 and enter the clean air space 116. In one or more embodiments, the screen 122 may also define openings that are smaller than the openings 161 of the grate 160. For example, the area of the openings 161 of the grate 160 may be greater than or equal to two times, greater than or equal to four times, greater than or equal to 10 times, greater than or equal to 20 times, etc. larger than the area of the openings of either or both of the screens 122.

Additionally, the impact of various size projectiles may have various associated impact footprints or areas on the filter system 112 or, specifically, the grate 160. Also, the area of impact may also include an associated static force. By knowing the force per unit area applied by the projectile and knowing the force required to shear the screen 122, the openings 161 of the grate 160 may be calculated. Further, the loads of impact on the grate 160 may be transferred into the aircraft 100 through the structures holding the filter media 124 (e.g., the housing 114) as well as the one or more struts 162.

One or more embodiments of the filter systems described herein such as, e.g., illustrative filter system 112, may also include one or more mounting brackets 142. Each of the mounting brackets 142 may be structured to be mounted to the air intake 110 of the aircraft engine 106 to support the filter system 112 relative to the aircraft engine 106. It may be apparent that a different number and/or configuration (e.g., size, shape, position, etc.) of brackets 142 may be employed in other embodiments to mount the filter system 112 to the aircraft engine 106, potentially depending on the aircraft 100 in which the filter system 112 is included. In at least one embodiment, the one or more mounting brackets 142 may include multiple mounting apertures such that the filter system 112 may be universal to multiple types of aircrafts 100.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like. It is noted that terms such as "top", "bottom", "above, "below", etc. may be used in this disclosure. These terms should not be construed as limiting the position or orientation of a structure, but should be used as providing spatial relationship between the structures.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed:

1. A method of compensating for airspeed when measuring pressure drop across a filter system mounted on an aircraft, wherein the filter system comprises a housing and filter media defining a clean air space into which air flows through the filter media, the method comprising:
   measuring an internal pressure within the clean air space, wherein the internal pressure varies as the airspeed changes;
   measuring an external pressure on the aircraft outside of the clean air space, wherein the external pressure is measured at an external location selected such that the external pressure varies as the airspeed changes and provides a known relationship relative to the internal pressure as the airspeed changes; and
   providing an alert in the aircraft indicative of filter restriction when a pressure differential between the internal pressure and the external pressure deviates by a selected amount.

2. The method of claim 1, wherein the method comprises adjusting the selected amount based at least in part on the known relationship.

3. The method as in any one of claims 1 and 2, wherein the alert indicative of filter restriction is provided over a selected range of airspeeds.

4. The method of claim 3, wherein the external location is selected such that the known relationship between the internal pressure and the external pressure is proportional over the selected range of airspeeds.

5. The method of claim 1, wherein the external location is disposed on a pressure compensator located outside of the clean air space and within an airstream of the aircraft.

6. The method of claim 5, wherein the pressure compensator defines a cross-sectional shape selected from the group consisting of circular, elliptical, semi-circular, and airfoil.

7. The method of claim 1, wherein providing an alert in the aircraft indicative of filter restriction comprises using a pressure switch to determine when the internal pressure deviates by the selected amount from the known relationship.

8. The method of claim 7, wherein the pressure switch provides a signal when the internal pressure deviates by the selected amount from the known relationship.

9. The method of claim 1, wherein the internal pressure is measured at an internal location and the external pressure is measured at the external location, wherein the internal and external locations are across the filter media from one another and proximate a similar location of the housing.

10. The method of claim 1, wherein measuring the internal pressure comprises using an internal pressure port within the clean air space and measuring the external pressure comprises using an external pressure port outside of the clean air space, wherein the method further comprises measuring the pressure differential between the internal pressure port and the external pressure port.

11. The method of claim 1, wherein the external pressure is measured proximate the filter media outside of the clean air space.

12. A filter system mounted on an aircraft, wherein the filter system comprises:
   a housing extending between a first end portion and a second end portion and defining a clean air space, wherein the housing defines a clean air port proximate the second end portion of the housing for coupling to an air intake;
   filter media located around the housing such that air flows through the filter media into the clean air space;
   a pressure compensator located outside of the clean air space and within an airstream of the aircraft, wherein the pressure compensator is configured to compensate for airspeed of the aircraft;
   an internal pressure sensor located within the clean air space and configured to measure an internal pressure in the clean air space, wherein the internal pressure varies as the airspeed changes; and
   an external pressure sensor located at an external position on the pressure compensator and configured to measure an external pressure outside of the clean air space, wherein the external pressure measured at the external position varies according to a known relationship relative to the internal pressure as the airspeed changes.

13. The filter system of claim 12, wherein the pressure compensator is coupled to the housing and protrudes from the housing.

14. The filter system of claim 13, wherein the pressure compensator defines a cross-sectional shape selected from the group consisting of circular, elliptical, semi-circular, and airfoil.

15. The filter system of claim 12, wherein the filter system is configured to provide an alert indicative of filter restriction when a pressure differential between the internal pressure and the external pressure deviates by a selected amount from the known relationship.

16. The filter system of claim 12, wherein the internal pressure sensor is proximate an internal location and the external pressure sensor is proximate the external location, wherein the internal and external locations are across the filter media from one another and proximate a similar location of the housing.

17. The filter system of claim 12, wherein the internal pressure sensor comprises an internal pressure port within the clean air space and the external pressure sensor comprises an external pressure port outside of the clean air space, wherein a pressure differential is measured between the internal pressure port and the external pressure port.

18. The filter system of claim 12, wherein the external pressure sensor is positioned such that the known relationship between the internal pressure and the external pressure is proportional over a selected range of airspeeds.

19. The filter system of claim 12, wherein the external pressure sensor is positioned such that the known relationship between the internal pressure and the external pressure is a known function over the selected range of airspeeds.

20. The filter system of claim 12, further comprising a grate proximate the first end portion of the housing and defining grate openings within the grate through which air passes when passing into the clean air space through the first end portion of the housing.

21. The filter system of claim 20, wherein the system comprises struts extending between the first and second end portions, wherein the struts support the grate and are configured to transfer forces incident on the grate to the aircraft in place of the housing of the filter system.

22. An aircraft comprising:
   a fuselage defining a forward direction;
   an aircraft engine operably coupled to the fuselage, wherein the aircraft defines an air intake for receiving intake air; and
   a filter system according to claim 12 coupled to the air intake, wherein air passing through the filter system enters the air intake during operation of the aircraft.

* * * * *